May 1, 1928.
H. STUKART
SLICING MACHINE
Filed Dec. 31, 1923
1,667,958
7 Sheets-Sheet 1
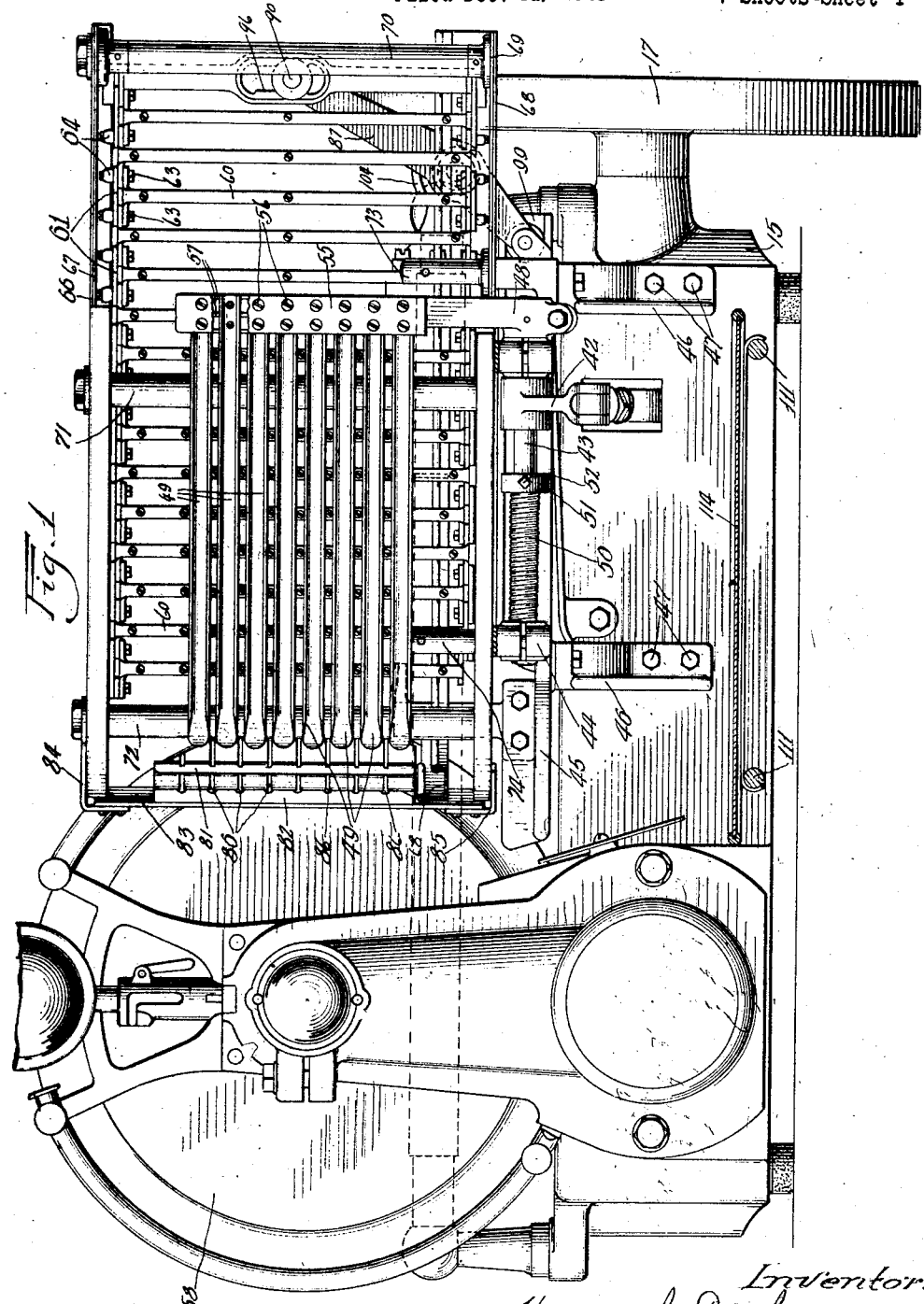
Inventor:
Hendrik Stukart
By Nissen & Crane

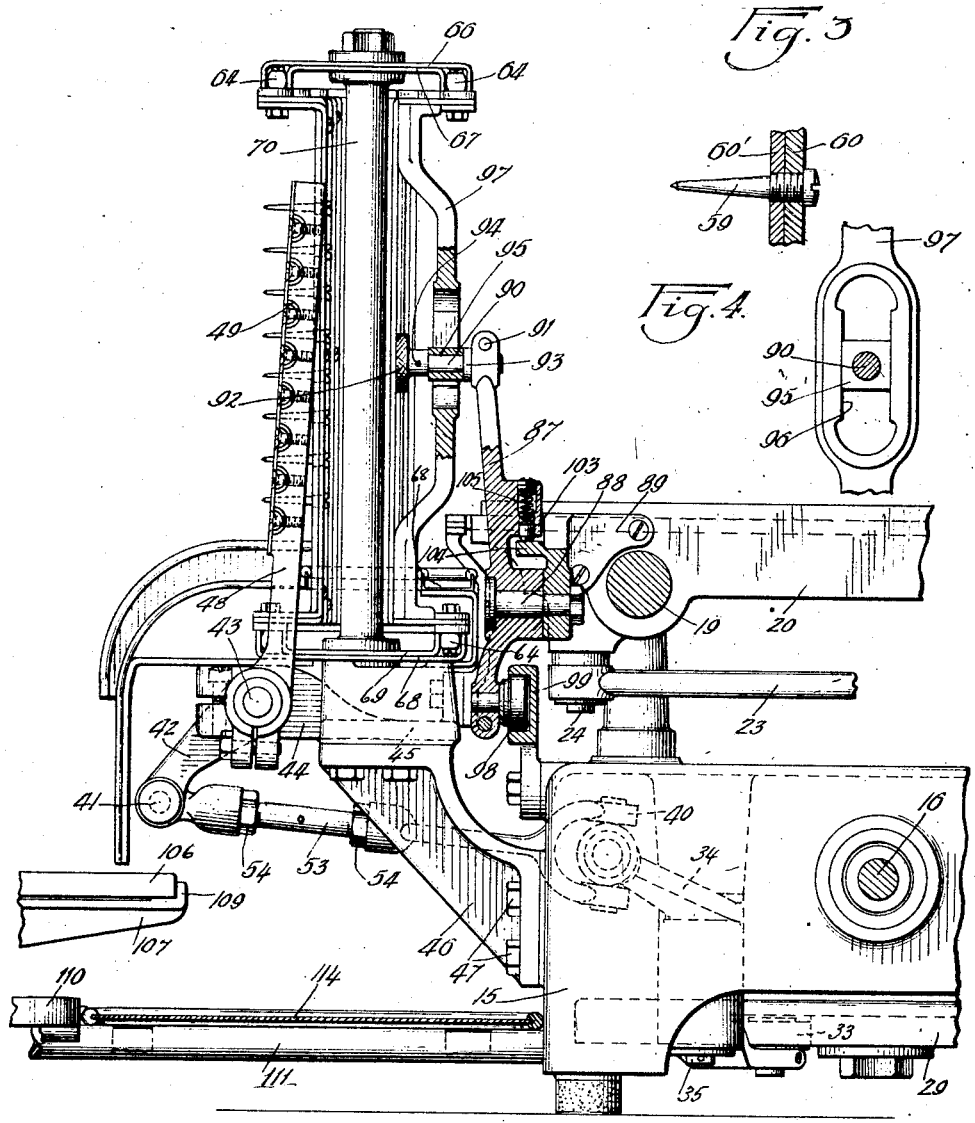

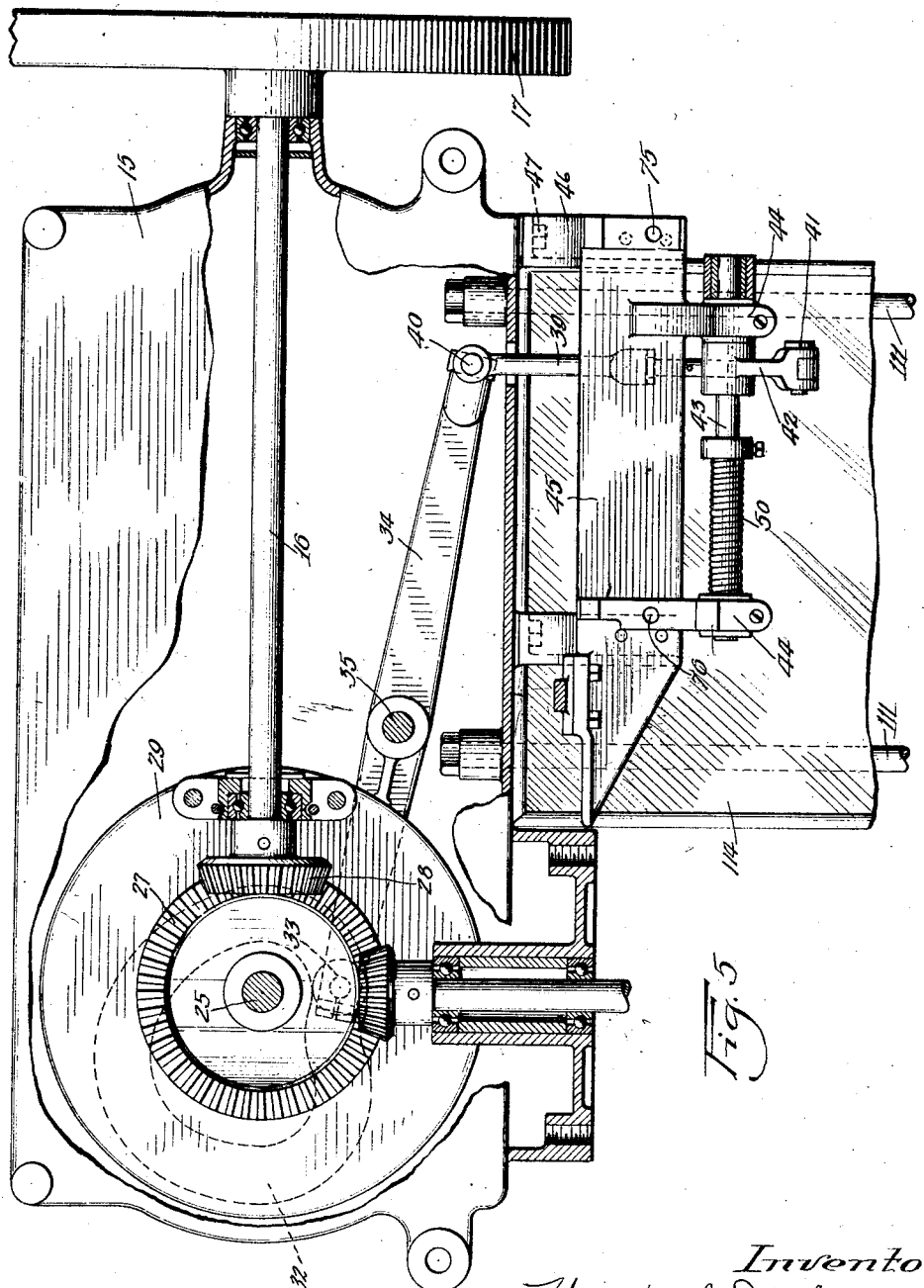

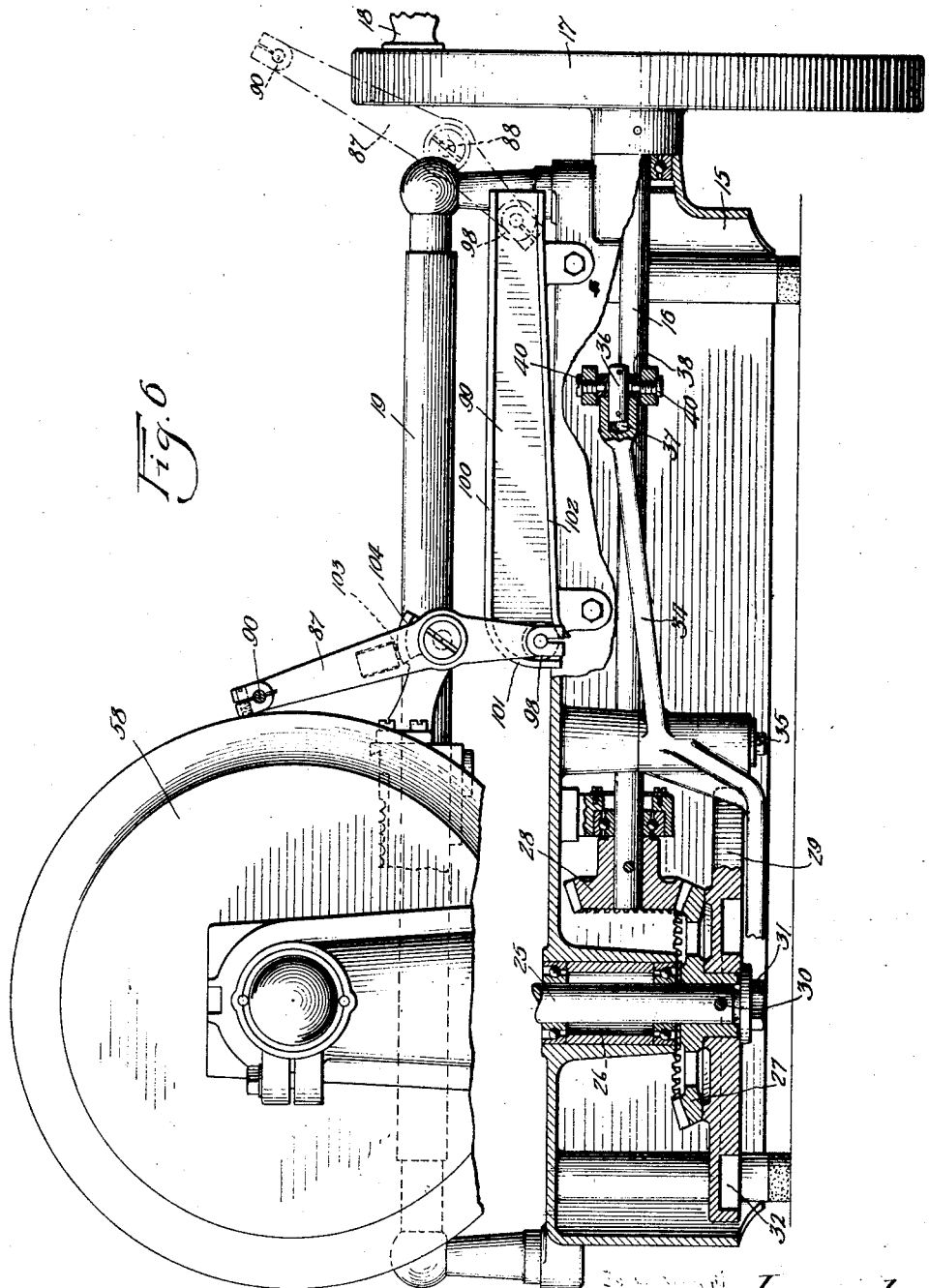

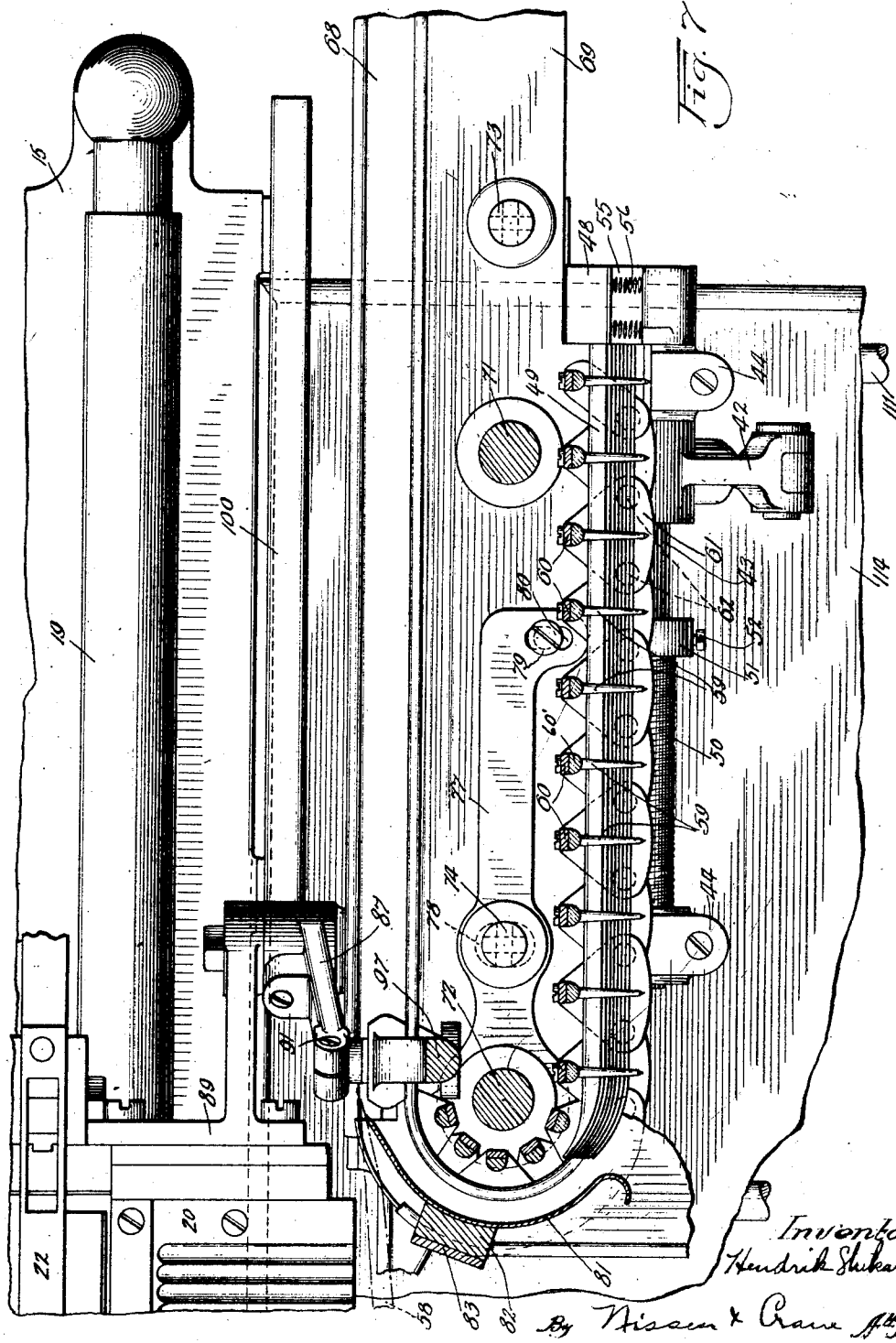

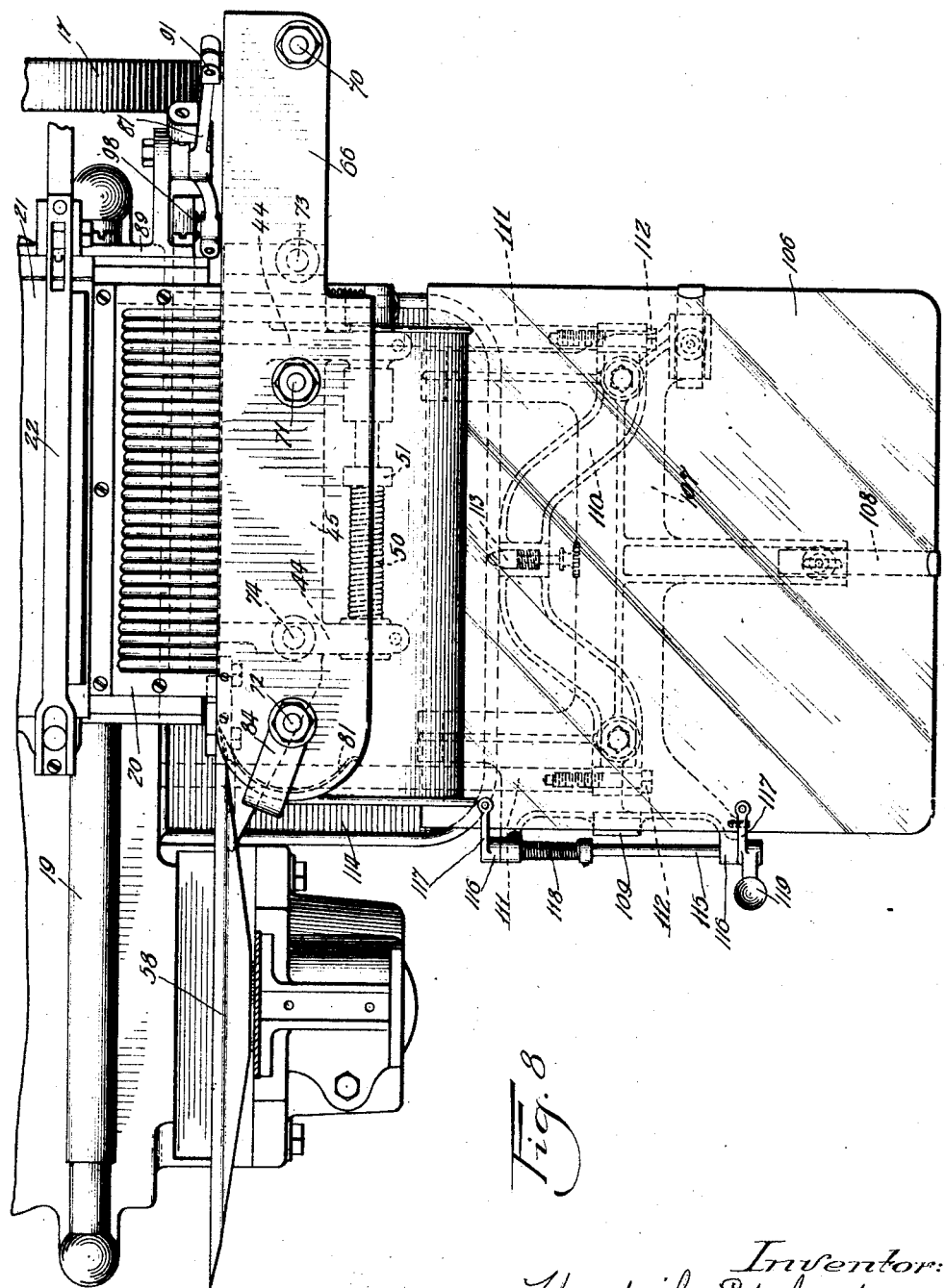

May 1, 1928.
H. STUKART
1,667,958
SLICING MACHINE
Filed Dec. 31, 1923
7 Sheets-Sheet 7
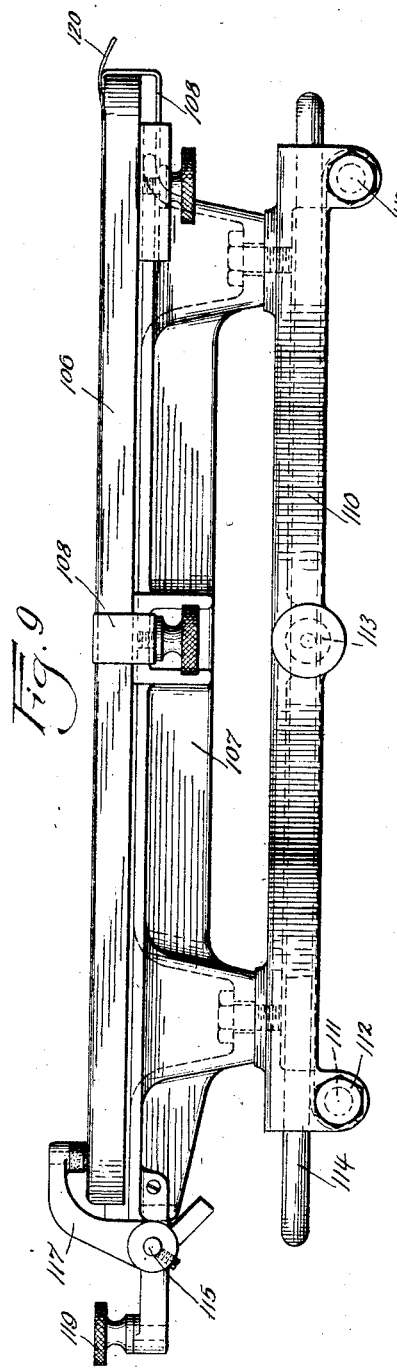
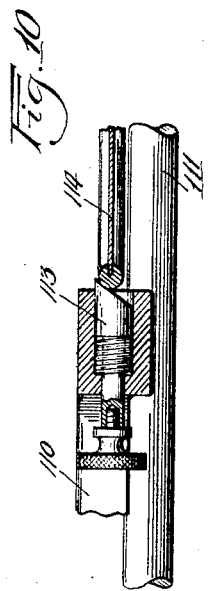
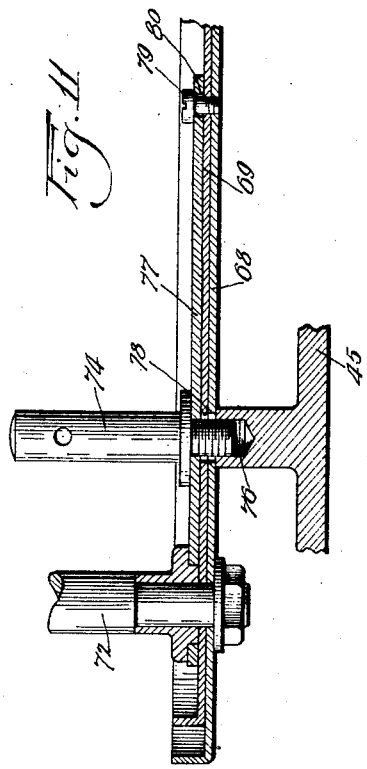
Inventor:
Hendrik Stukart Patented May 1, 1928.

1,667,958

UNITED STATES PATENT OFFICE.

HENDRIK STUKART, OF LA PORTE, INDIANA, ASSIGNOR TO U. S. SLICING MACHINE COMPANY, OF LA PORTE, INDIANA, A CORPORATION OF INDIANA.

SLICING MACHINE.

Application filed December 31, 1923. Serial No. 683,548.

This invention relates to a machine for slicing meat or other material and has for its object the provision of such a machine which shall be of improved construction and operation, which shall be provided with mechanism for stacking the slices, and which may be hand operated.

The invention is exemplified in the combination and arrangement of parts shown in the accompanying drawings and described in the following specification, and it is more particularly pointed out in the appended claims.

In the drawings—

Fig. 1 is a front elevation of a slicing machine embodying one form of the present invention;

Fig. 2 is a fragmentary side elevation, with parts in section;

Figs. 3 and 4 are sectional views of details;

Fig. 5 is a fragmentary top plan view, with parts broken away;

Fig. 6 is a fragmentary front elevation, with the stacker removed and parts broken away;

Fig. 7 is a fragmentary top plan view, with parts in section;

Fig. 8 is a top plan view of the stacker mechanism and receiving table as applied to the slicing machine;

Fig. 9 is a front elevation of the receiving table; and

Figs. 10 and 11 are fragmentary sectional views showing details of construction.

As shown in the drawings, the numeral 15 designates the base or main frame of a slicing machine having a main drive shaft 16 journaled therein and provided with a fly-wheel 17 and a handle 18 for hand operation of the machine. The frame 15 carries guides or ways 19 having a meat table or carriage 20 slidably mounted thereon. A meat plate 21 is mounted to slide on the carriage 20 in a direction transverse to the movement of the carriage 20. A clamp 22 of any suitable construction may be provided for securing the material to be sliced upon the plate 21 and any well-known form of feed mechanism may be employed to feed the plate 21 forwardly the thickness of a slice after the completion of each reciprocation of the table 20.

The table 20 is reciprocated by a pitman rod 23 pivotally connected at 24 to the table 20, the pitman rod being driven by a crank, not shown, but connected to the upright shaft 25. The shaft 25 is journaled in a bearing 26 in the main frame 15 and carries a crown gear 27 driven by a beveled gear 28 secured to the main drive shaft 16. Fastened to the shaft 25 beneath the crown gear 27 is a cam disc 29 fixed to the shaft 25 by a pin 30 and nut 31. The cam disc 29 is provided with a cam groove 32 which operates a cam roller 33 mounted on the end of the reciprocating arm or lever 34. The lever 34 is pivoted on a stud 35 extending downwardly from the frame 15 and the end of the lever 34 opposite the cam roller 33 carries a bearing pin or stud 36 fixed in a recess 37 in the end of the lever.

A collar 38 is journaled on the pin 36 and receives the bifurcated end of a link 39. Each bifurcation of the link 39 is provided with a screw 40 which projects into openings in the collar 38, thus permitting the link 39 to swing in a horizontal direction about the end of the lever 34 while the collar 38 permits of vertical movement of the link about the end of the lever. The forward end of the link 39 is pivoted at 41 to an arm 42 extending downwardly from the rock shaft 43 which is journaled in brackets 44 projecting forwardly from a supporting plate 45 upon which is mounted a conveyer frame for transferring slices after they have been severed from the material upon which the machine operates. The plate 45 is supported by a pair of brackets 46 secured to the main frame 15 by cap screws 47. The shaft 43 carries an upwardly extending arm 48 to which a series of laterally projecting fingers 49 are attached.

By the chain of connections described, rotation of the hand wheel 17 will impart an oscillatory movement to the arm 48 and fingers 49 for depositing slices as they are formed by the slicing machine. To take up any lost motion in the chain of mechanism the shaft 43 is surrounded by a coil spring 50 having one end attached to a collar 51 and the other end secured to the bearing 44 in which the shaft 43 is journaled. The tension on the spring 50 may be regulated by a set screw 52 by which the collar 51 is held in adjusted positions on the shaft 43. Since the spring 50 tends to rotate the shaft 43 it will hold the connected parts of the chain of mechanism between the shaft and the cam 29 in close contact with one another and press the roller 33 firmly against the cam surface by which it is operated. If the various bearings wear in time so as to permit a slight displacement of the shaft 43 under the tension of the spring 50 the position of the fingers 49 and arm 48 may be readjusted by means of a turnbuckle 53 interposed between the ends of the link 39 and provided with lock nuts 54, as shown in Fig. 2. A positive operation of the discharge fly, including the arm 48 and fingers 49, is thus provided and the fly is always returned to a definite position at the close of each operation so that it may properly cooperate with the slice conveyer in a manner to be described. The initial position of the fly may be adjusted by the turnbuckle 53 whenever conditions require.

The fingers 49 are secured to the arm 48 by means of a cover plate 55 held in place by a series of screws 56. The fingers 49 are arcuate in section, as shown in Fig. 2, and may be formed from tubes split longitudinally. The arm 48 is provided with a series of ribs 57 which have arcuate notches cut therein to receive the convex faces of the fingers 49 and the cover plate 55 carries a series of projections on the rear face thereof which extend into the concave portions of the fingers 49. A pair of screws 56 is provided for each finger and these screws are located between the ribs 57. This arrangement provides a three-point bearing for each finger with intermediate tightening screws so that any irregularity in the bearing surfaces may be taken up by properly tightening the screws, thus avoiding any looseness or wabble in the fingers.

As the table 20 reciprocates on its guides 19 slices are severed from the material held in the clamp 22 by means of the rotary disc knife 58. As the slices are formed they are received by a series of pins 59 mounted on the conveyer flights 60. The pins 59, as shown in Fig. 3, have elongated tapered portions which provide relatively fine points for entering the slices, but afford sufficient strength near the bases of the pins to prevent easy bending. The pins pass through openings threaded into reinforcing strips 60' which are thus held against the flights 60 to stiffen the flights and lock the pins in place thereon. The conveyer flights 60 are formed integrally with triangular plates 61 pivoted to one another at 62 to constitute a conveyer chain. The conveyer flights 60 are provided with link plates 61 both at the top and bottom of the flights. The link plates 61 are connected together by pivot bolts 63 which extend beyond the plates and carry rollers 64 which travel in guideways at the top and bottom of the conveyer frame respectively. These guideways are formed by plates 66 and 67 at the top of the conveyer frame and 68 and 69 at the bottom of the frame. The edges of the plates are bent laterally in spaced relation to one another providing walls for the guideways in which the rollers 64 travel. The upper and lower plates are held together and spaced from one another by three upright rods or bars 70, 71 and 72. This arrangement provides a self-contained frame upon which the conveyer is mounted and which may be lifted bodily from the slicing machine if desired.

The conveyer frame is supported upon the plate 45 and held in place by a pair of removable pins 73 and 74 which extend through openings in the bottom plates 68 and 69 and enter recesses 75 and 76, respectively, in lugs projecting upwardly from the plate 45, as shown in Figs. 1 and 5. As will be understood from Fig. 7 the pin 73 constitutes a pivotal support about which the entire conveyer frame may be slightly rotated in a horizontal direction to move the left-hand end, as viewed in that figure, toward and away from the slicing knife 58.

To regulate the position of the conveyer frame relative to the knife a plate or lever 77 is pivoted adjacent the plate 69 on the spacing bar 72. The central portion of the lever is provided with a pivotal opening for receiving the pin 74 and the plates 68 and 69 are provided with a somewhat elongated opening 78 through which the pin 74 projects. Movement of the lever 77 about the pin 74 will swing the left-hand end of the conveyer frame toward or away from the slicing knife, thus providing accurate adjustment of the position of the conveyer frame relative to the knife. The lever 77 is held in its adjusted positions by means of a screw 79 passing through an elongated slot 80 in the end of the lever and threaded into the plate 69.

A guide plate or shield 81 is mounted adjacent the knife 58 and is supported on a block 82 carried by a bar 83. The bar 83 is connected at its upper and lower ends, respectively, to angle brackets 84 and 85 which are adjustable about the rod 72 to move the guard 81 toward and away from the knife 58 relative to the conveyer frame. It will be understood that this adjustment is in addition to the adjustment of the entire frame toward and from the knife.

The plate 81 is provided with a series of slots 86 through which the points of the conveyer pins 59 project as the conveyer travels around the end of the frame. This holds the slice in place as it moves about the end of the conveyer frame and the shape of the plate 81 may be such as to force the slice backwardly upon the pins a sufficient distance to insure retaining the slice in place on the pins until it is discharged therefrom by the fingers 49. It will be noted that the position of the slice on the pins is in substantial alinement with the pivotal joints in the conveyer chain so that the supporting portions of the pins remain a constant distance apart during their movement about the end of the conveyer frame, thus avoiding any stretching or wrinkling of the slice.

The conveyer is actuated from the reciprocating table 20 by means of a lever arm 87 pivotally mounted on a pin 88 carried by a bracket 89 secured to the reciprocating table 20. The upper end of the arm 87 supports a pin 90 threaded into the end of the arm 87, the arm being slotted and provided with a screw 91 by which the pin 90 may be locked in place. The pin 90 may be provided with a thumb nut 92 and a shoulder 93. The thumb nut 92 is removably held in place by a lock pin 94 and a bearing block 95 is interposed between the thumb nut and the shoulder 93. The block 95 is journaled on the pin 90 and is rectangular in shape, as shown in Fig. 4. This block is slidably mounted in an elongated opening 96 in an upright bar 97 which joins the endmost links of the conveyer chains.

As the arm 87 is carried back and forth with the reciprocating table 20 it will produce a reciprocating movement of the slice conveyer so that the slices are taken up by the pins 59 as they are severed by the knife and are carried about the end of the conveyer frame to the front face thereof. The pins 59 at the front of the conveyer frame pass between the fingers 49 of the discharge fly so that when the fly is operated by the cam 29 the slice will be stripped from the pins and deposited on a suitable receiving plate. During the movement of the carriage 20 the arm 87 is held against rotation on the pin 88 by a cam roller 98 at the lower end of the arm which travels in a guide channel 99.

The form of the guide channel 99 is best shown in Fig. 6. At the beginning of the feeding movement of the table 20 the arm 87 is in the position shown in broken lines in Fig. 6 with the roller 98 bearing against the upper flange 100 of the channel 99. As the fulcrum 88 of the arm is moved forward by the table 20 in a direction parallel with the flange 100 the roller 98 will be held in contact with the upper flange by the torsion due to the load of the conveyer chain on the pin 90. As the table 20 approaches the end of its movement after the slice has been severed the roller 98 will strike the downwardly curved portion 101 of the flange 100, thus checking the movement of the roller 98 and imparting an accelerated movement to the upper end of the arm 87 and the slice conveyer attached thereto. This accelerated movement carries the slice about the curved end of the conveyer frame into position to be discharged and the parts are so timed that the discharge fly will operate at the time that the table 20 reverses its movement at which time the conveyer will be stationary.

It has been found desirable to avoid a quick reversal of the movement of the conveyer at the end of its accelerated forward movement and for this reason the lower flange 102 of the guide channel 91 is given a gradual inclination for the purpose of returning the arm 87 to its initial position shown in broken lines in Fig. 6. In order to retain the roller 98 upon the guide flange 102 and prevent any oscillation of the lever 87 while the roller is traveling in the portion of the channel 99 which is of greater width than the diameter of the roller, it has been found desirable to provide a friction member 103 which bears against an arcuate flange 104 under pressure exerted by the spring 105. Without the use of restraining member of this kind the reverse movement of the feed table imparts sufficient momentum to the conveyor so that at some point in the reverse movement the conveyer is apt to over-run as the motion of the table is checked near the reverse end of the stroke. When this occurs the roller 98 will be swung upwardly against the flange 100 and thus produce a knocking sound in the operation of the machine. The friction member 103 prevents this occurrence.

The slices are received from the discharge fly upon a plate or table 106. The table 106 is supported upon a spider 107 having adjustable hooks or clamps 108 and stops 109 for removably clamping the plate 106 upon its supporting spider. The spider 107 is carried by a cross-bar 110 which is secured to the forward ends of a pair of supporting rods 111. The supporting rods 111 project forwardly from the main frame 15 and are provided with cap screws 112 at their forward ends which pass through the ends of the cross-bar 110 and are threaded into the supporting rods 111. The central portion of the cross-bar 110 is curved rearwardly and carries a spring catch 113, as shown in Fig. 10. This catch engages the front edge of a crumb tray 114 which rests upon the rods 111 between the bar 110 and the front face of the main frame 15, as shown in Figs. 2 and 5.

A rod 115 is journaled at one side of the table 106 in bearings 116 carried on the spider 107. A pair of fingers 117 are attached to opposite ends of the rod 115 and are pressed by a coil spring 118 upon the upper face of the table 106. The fingers 117 may be released by a thumb lever 119 to permit the insertion of a sheet of paper 120 beneath the fingers and upon the upper surface of the table 106, as shown in Fig. 6. The fingers 117 retain the paper in place, but may be readily released to permit the paper to be wrapped about the slices deposited upon its upper surface.

I claim:—

1. The combination with a slicing machine, of means for discharging slices therefrom, and a cam having an upright axis of rotation for operating said discharging means.

2. The combination with a slicing machine having a main drive shaft and a crown gear operated by said drive shaft, of means for discharging slices from said machine, and a cam connected with said crown gear for rotation therewith, said discharging means being actuated by said cam.

3. The combination with a slicing machine having a main drive shaft, an upright shaft operated by said main drive shaft, and a cam connected with said upright shaft, of means for discharging slices from said slicing machine, and means for actuating said discharging means from said cam.

4. The combination with a slicing machine having a reciprocating table, a main drive shaft, an upright shaft actuated by said main drive shaft, a crank connected with said upright shaft, and means for actuating said reciprocating table from said upright shaft, of a cam connected with said upright shaft, a device for discharging slices from said slicing machine, and a lever actuated by said cam for operating said discharging device.

5. The combination with a slicing machine having a rotary slicing knife, means for driving said knife, a cam connected with said driving means, a horizontal lever actuated by said cam, and means operated by said lever for discharging slices formed by said knife.

6. In a slicing machine, a horizontally disposed frame plate, an upright shaft passing through said frame plate, a cam secured to said shaft beneath said frame plate, a lever pivoted beneath said frame plate for oscillation about an upright axis, said lever being operated by said cam, and mechanism actuated by said lever for discharging slices from said slicing machine.

7. A slicing machine having a rotary slicing knife, a supporting frame for said knife, mechanism for driving said knife, a cam connected with said driving mechanism, a horizontally disposed lever actuated by said cam, mechanism for discharging slices formed by said knife, and a link connected with one end of said lever for actuating said slice discharging mechanism, said link being pivoted to said lever to move in two directions relative thereto.

8. A slicing machine comprising a frame plate, a horizontally disposed drive shaft journaled beneath said frame plate, an upright shaft extending through said frame plate, beveled gears for actuating said upright shaft from said main drive shaft, a cam disc secured to said upright shaft beneath said frame plate, a horizontally disposed lever pivoted beneath said frame plate for movement about an upright axis, a roller carried by one end of said lever and engaging said cam to be actuated thereby, a link pivoted to the end of said lever opposite said cam roller and having angular movement in two directions relative thereto, and a reciprocating fly actuated by said link for discharging slices from said slicing machine.

9. The combination with a slicing machine having driving means, of a device for discharging slices from said slicing machine, means for connecting said discharging device with said driving means, and a spring for taking up lost motion in the connection between said driving means and slice discharging device.

10. The combination with a slicing machine having driving means, of a reciprocating slice discharging device, and means for connecting said discharging device with said driving means, said connecting means being adjustable to regulate the position of said discharging device.

11. The combination with a slicing machine having driving means therefor, of a reciprocating slice discharging device, and a link connecting said driving means and discharging device, said link being extensible and contractable to adjust the position of said discharging device.

12. The combination with a slicing machine having driving means, of a slice discharging device, means for connecting said discharging device with said driving means, a spring for taking up lost motion in the connection between said driving means and slice discharging device, and means for adjusting said connection to vary the position of said discharging device.

13. The combination with a slicing machine having driving means, of a reciprocating lever actuated by said driving means, a reciprocating fly for discharging slices, a link connecting said lever and fly, and a spring tending to move said fly in one direction to maintain close contact between said fly and the operating parts connected thereto, said link being adjustable in length to vary the position of said fly.

14. The combination with a slicing machine having driving means, of a cam operated by said driving means, a slice discharging device, means for actuating said slice discharging device from said cam, and a spring for maintaining close contact between said cam and said actuating means.

15. The combination with a slicing machine having driving mechanism, of a cam connected with said driving mechanism for rotating about an upright axis, a horizontally disposed lever operated by said cam, a discharge fly pivoted to move about a horizontal axis, a link connecting said lever and fly, a spring tending to rotate said fly about its axis to maintain close connections between said fly, link, lever and cam, and means for adjusting the length of said link to vary the position of said fly.

16. The combination with a slicing machine, of reciprocating mechanism for receiving slices therefrom, and means for imparting a different rate of speed to said mechanism during movement in one direction thereof from the speed of said mechanism during its reverse movement.

17. The combination with a slicing machine, of reciprocating mechanism for receiving slices therefrom, and a pair of cam tracks for controlling said reciprocating mechanism, said cam tracks having different contours to impart different characters of movement to said receiving mechanism in the different directions of said movement.

18. The combination with a slicing machine, of a recipricating device for receiving slices therefrom, means for imparting rapid acceleration to said device as it approaches the end of its receiving movement, and means for imparting less rapid acceleration to said device on its return movement.

19. The combination with a slicing machine having a slicing knife and a reciprocating feed table, of a conveyer for receiving slices as they are formed by said knife, means for accelerating the movement of said conveyer relative to the movement of said table as said table approaches the end of a feeding movement, and means for imparting less rapid acceleration to said conveyer during the return movement of said table.

20. The combination with a slicing machine having a reciprocating table and a slicing knife, of a conveyer for receiving slices formed by said knife, a lever pivoted to said reciprocating table and connected with said conveyer, and a cam track for controlling said lever, said cam track having a portion for causing said conveyer to travel in unison with said table during a slicing operation and for giving an accelerated motion to said conveyer at the completion of said slicing operation and having a different portion for controlling said lever during the return movement of said table to impart to said conveyer a gradually accelerated movement relative to said table.

21. A slicing machine comprising a reciprocating work supporting table, a knife for slicing material carried by said table, a conveyer for receiving slices formed by said knife, means carried by said table for driving said conveyer, a pair of spaced cam tracks for controlling said conveyer driving means, and a friction device for preventing lost motion of said conveyer driving means.

22. A slicing machine comprising a reciprocating work supporting table, a knife for severing slices from material carried by said table, a lever pivoted to move the said table, a conveyer connected with one end of said lever and movable with said table for receiving slices formed by said knife, a cam roller mounted on the opposite end of said lever, a pair of spaced cam tracks having different contours for guiding said roller during forward and return movements of said carriage respectively, and a friction device for resisting movement to said lever about its pivot to prevent free movement of said roller from one to the other of said cam tracks.

23. A slicing machine comprising a reciprocating table, a slicing knife, a conveyer for receiving slices formed by said knife, a member secured to said table for actuating said conveyer, a pivot pin carried by said member for engaging said conveyer, an actuating member secured to said conveyer having a slot therein for receiving said pivot pin, and a rectangular head journaled on said pivot pin and slidably mounted in a slot in said actuating member.

24. The combination with a slicing machine of a conveyer for receiving slices therefrom, means for discharging slices from said conveyor and a cam having an upright axis of rotation for operating said discharging means.

25. The combination with a slicing machine having a main drive shaft, an upright shaft operated by said main drive shaft, and a cam connected with said upright shaft, of a conveyer for receiving slices from said slicing machine, means for discharging the slices from said conveyor, and means for actuating said discharging means from said cam.

26. A slice discharging device for slicing machines comprising a reciprocating arm having spaced ribs extending longitudinally thereof, slice engaging fingers extending transversely of said arm and fitted into depressions formed in said ribs, a holding member engaging said fingers, and a plurality of screws arranged between said ribs for securing said holding member against said fingers to lock said fingers in place on said arm.

27. A slice discharging device for slicing machines comprising a reciprocating arm having spaced longitudinally extending ribs thereon, a plurality of transversely curved fingers arranged transversely of said arm and fitted into notches formed in said ribs, a cover plate having projections thereon for engaging said fingers, and screws for holding said cover plate and fingers in position on said arm, said screws being located in pairs intermediate said ribs, there being one pair of screws for each finger.

28. The combination with a slicing machine, of stacking mechanism for discharging slices from said machine, a horizontally disposed table for receiving the slices from said discharging mechanism, and a clamp for securing a sheet of paper or like material to the upper face of said table, said clamp comprising a spring actuated shaft having clamping fingers for engaging the paper on said table and having a thumb lever for releasing said fingers against the tension of said spring.

29. The combination with a slicing machine, of slice discharging mechanism therefor, a table for receiving slices from said discharging mechanism, a support for said table, a crumb tray positioned on said support beneath said slice discharging mechanism, and a spring catch for retaining said crumb tray in position on said support.

30. The combination with a slicing machine, of a slice receiving conveyer, and means for adjusting said conveyer toward and from said slicing machine.

31. The combination with a slicing machine having a slicing knife, a frame mounted adjacent said knife and having a slice receiving conveyer thereon, means for adjusting said frame and conveyer toward and from said knife, and means for locking said frame and conveyer in their adjusted position.

32. The combination with a slicing machine having a slicing knife, a frame pivotally mounted adjacent said machine with one end thereof adjacent said knife, a lever for swinging said end of said frame toward and from said knife, means for locking said lever to hold said frame in its adjusted positions, and a slice receiving conveyer carried by said frame.

33. A slicing machine comprising a slicing knife, a conveyer frame pivoted on said machine and having one end thereof arranged adjacent said slicing knife, a guard on said frame having one edge thereof fitted against the face of said knife, said guard being adjustable on said frame toward and from said knife and means for adjusting said frame and guard in unison with one another toward and from said knife.

34. The combination with a slicing machine having a slicing knife thereon, of a conveyer frame having one end thereof adjacent said knife and pivotally mounted on said machine at a point spaced from said knife, a lever pivoted on said frame at the end thereof adjacent said knife and fulcrumed on a pivot fixed to said slicing machine to permit said frame to be swung toward and from said knife by movement of said lever about its fulcrum, and means for locking said lever in its adjusted positions.

In testimony whereof I have signed my name to this specification on this 27th day of December, A. D. 1923.

HENDRIK STUKART.